United States Patent [19]
Tu et al.

[11] Patent Number: 6,005,684
[45] Date of Patent: Dec. 21, 1999

[54] SHEET-FEED TYPE SCANNER WITH DOCUMENT SHEATHE

[75] Inventors: Hsin-Hung Tu; Hsien-Che Hung, both of Hsin-Chu, Taiwan

[73] Assignee: Mustek Systems Inc., Hsinchu, Taiwan

[21] Appl. No.: 08/998,678

[22] Filed: Dec. 29, 1997

[51] Int. Cl.[6] ..................................................... H04N 1/04
[52] U.S. Cl. ............................................ 358/496; 271/162
[58] Field of Search ..................................... 358/473, 474, 358/476, 480, 482, 483, 484, 486, 487, 490, 491, 492, 494, 497, 498, 496; 355/308, 233, 234, 235; 382/312; 271/9.08, 162, 163, 164

[56] References Cited

U.S. PATENT DOCUMENTS

| | | | |
|---|---|---|---|
| 4,893,196 | 1/1990 | Koshiyouji et al. | 358/474 |
| 5,767,990 | 6/1998 | Ikeda | 358/475 |
| 5,786,590 | 7/1998 | Lin | 250/208.1 |
| 5,801,852 | 9/1998 | True | 358/502 |

Primary Examiner—Jerome Grant, II
Attorney, Agent, or Firm—W. Wayne Liauh

[57] ABSTRACT

A sheet-feed type scanner including a scanner base defining a scanning plane and having a document feed hole at one end into which document to be scanned is inserted; an image pick-up mechanism fixedly mounted in the scanner base and comprised of a light source, a reflector, a focus lens and an image sensor, and adapted to pick up image of inserted document within the scanning plane and to convert detected image signal into corresponding electrical signal; a document sheathe adapted for holding document for scanning, the document sheathe having a first flat sheet member and a second flat sheet member connected together for holding document in there between in a flat manner for scanning; and a transmission mechanism controlled to move the document sheathe along the scanning plane, for permitting document to be scanned by the image pick-up mechanism; and a document guide adapted for guiding the document sheathe through the scanning plane.

4 Claims, 6 Drawing Sheets

SHEET-FEED TYPE SCANNER WITH DOCUMENT SHEATHE

BACKGROUND OF THE INVENTION

The present invention relates to sheet-feed type scanners, and more particularly to such a sheet-feed type scanner which uses a document sheathe to hold document so that document will not be jammed or damaged when scanning.

In a regular sheet-feed type scanner, the image sensor is immovable, and document is moved by a transmission mechanism over the image sensor. This structure of scanner needs less table space, however it still has numerous drawbacks as outlined hereinafter.

1. Document tends to be damaged. When a document, for example, a picture, is moved over the rollers of the transmission mechanism, its surface tends to be damaged.
2. Document tends to be jammed. Because document touches the rollers of the transmission mechanism during scanning, it tends to be jammed when it is obliquely inserted into the document feed hole.
3. The troubleshooting and maintenance works are complicated. Because the size of this type of scanner is small and its internal mechanical mechanism is complicated, it is difficult to eliminate the trouble when document is jammed.
4. The scanning quality is low. Because document touches the rollers of the driving mechanism, document tends to be stained or rubbed, causing a shadow or black lines to occur in the scanned image.
5. The application range is limited. This structure of scanner is not practical for scanning document of irregular edges or thin document because they tend to deviate from the course during scanning.

SUMMARY OF THE INVENTION

It is one object of the present invention to provide a sheet-feed type scanner which comprises a document sheathe for holding document for scanning so that document will not be jammed when scanning. It is another object of the present invention to provide a document sheathe for a sheet-feed type scanner which protects document in scan without affecting the scanning quality. It is still another object of the present invention to provide a document sheathe for a sheet-feed type scanner which permits document to be quickly loaded and inserted into the scanner for scanning. It is still another object of the present invention to provide a document sheathe for a sheet-feed type scanner which is an independent device that can be conveniently taken out of the scanner in case of a scanning trouble or power failure. It is still another object of the present invention to provide a sheet-feed type scanner which is practical for scanning reflective document and penetrative document.

DETAILED DESCRIPTION OF THE PREFERRED EMBODIMENT

Figure 1:
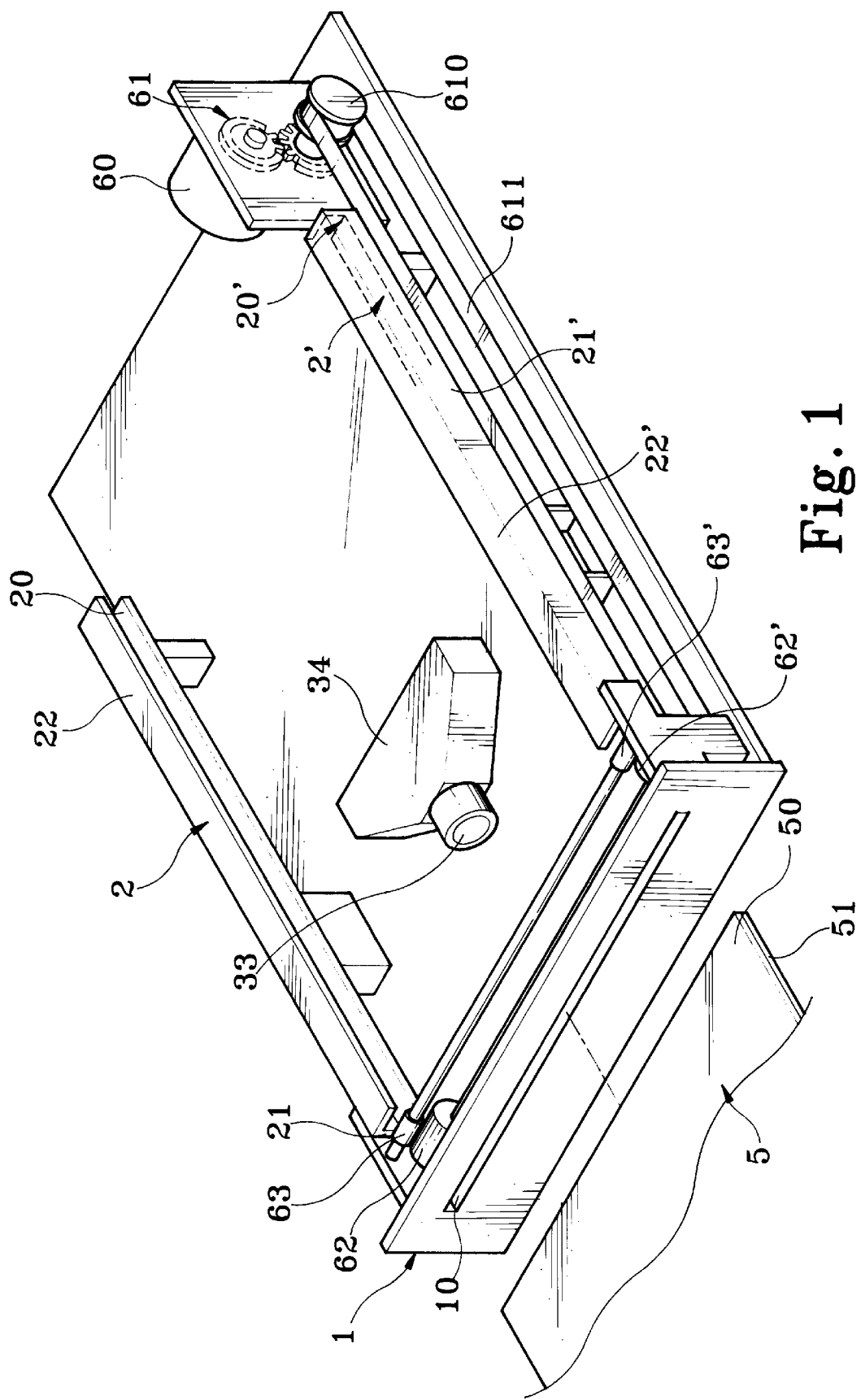
FIG. 1 is a perspective elevational view of a sheet-feed type scanner according to the present invention (the scanner cover excluded)
Figure 2:
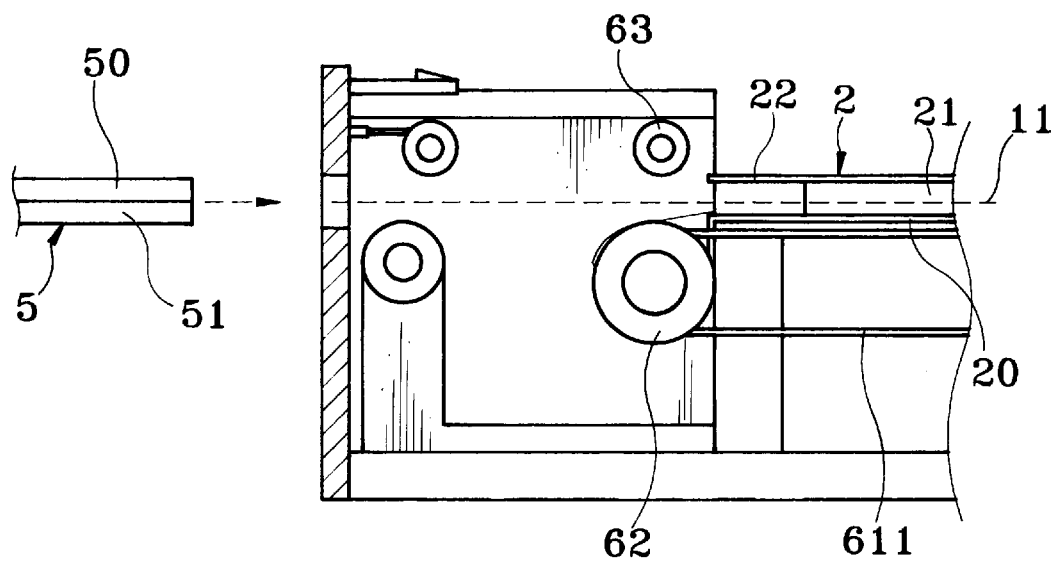
FIG. 2 is a side view in section of the front part of the sheet-feed type scanner shown in FIG. 1.
Figure 3:
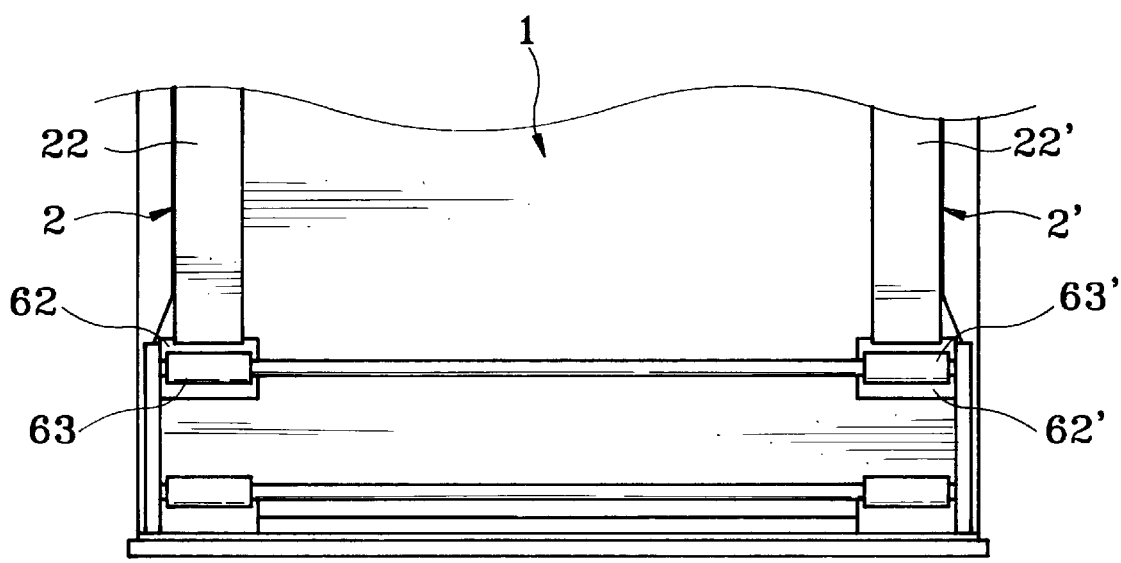
FIG. 3 is a top view in section of the front part of the sheet-feed type scanner shown in FIG. 1.
Figure 4:
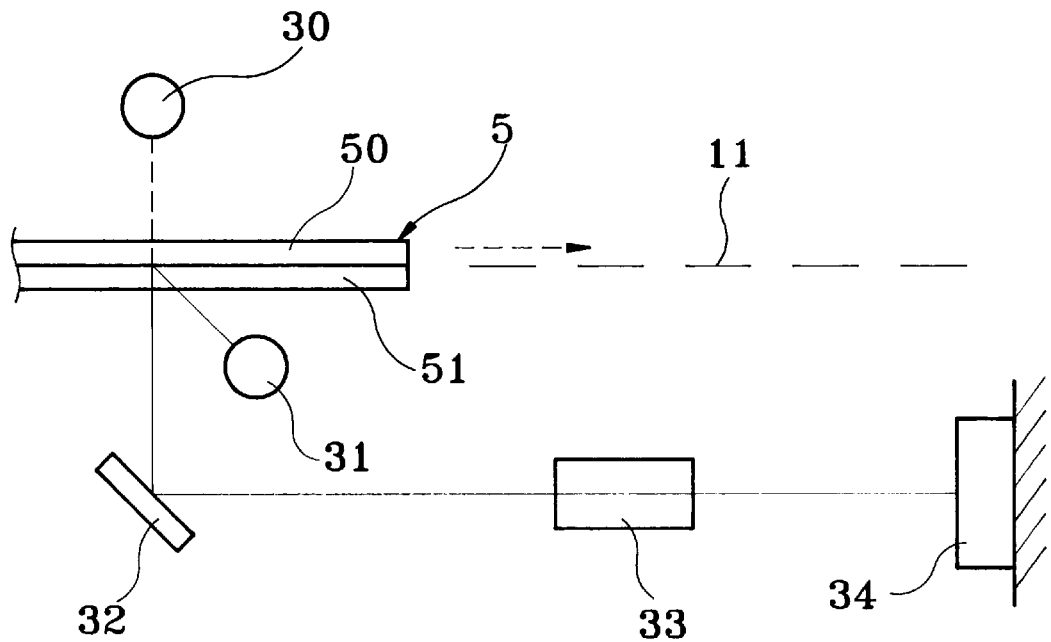
FIG. 4 is a schematic drawing showing the arrangement of the image pick-up mechanism and the document path according to the present invention.
Figure 5:
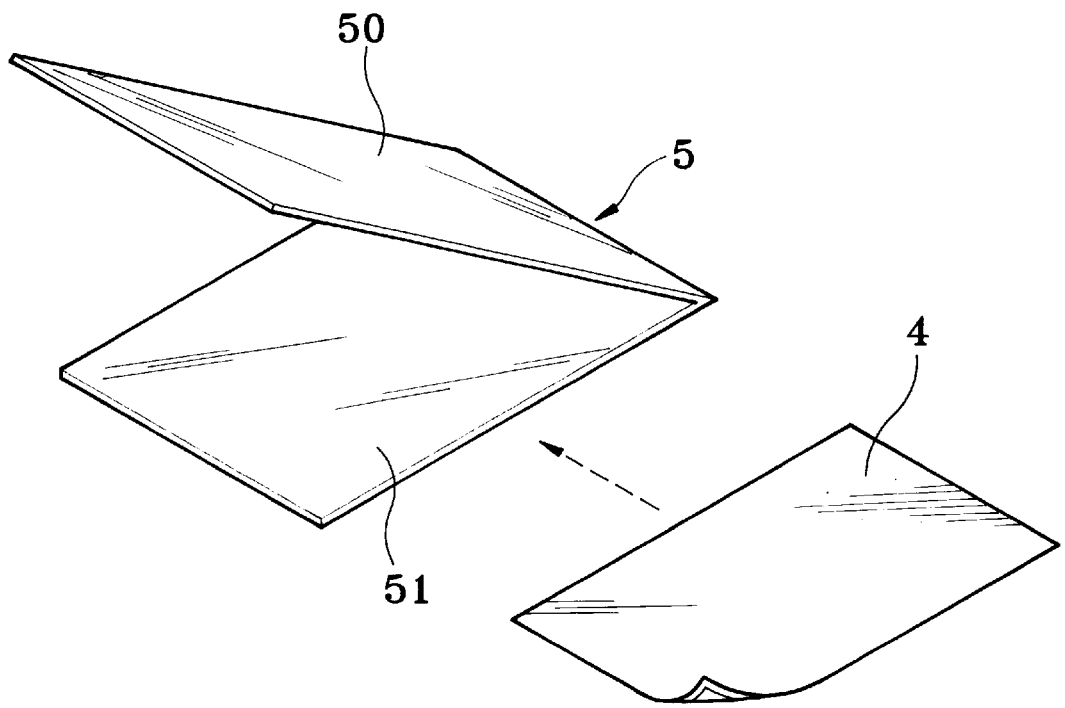
FIG. 5 shows the structure of the document sheathe according to the present invention.
Figure 6:
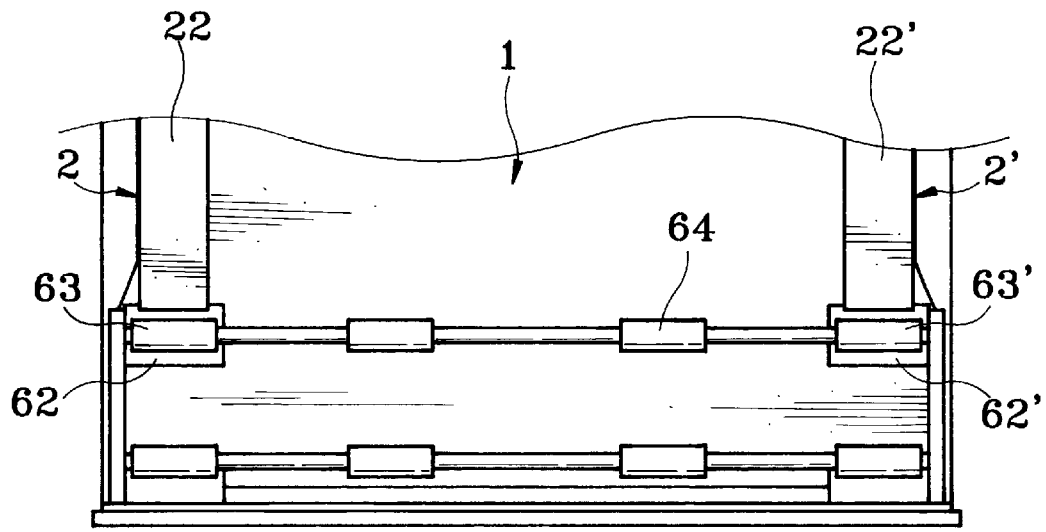
FIG. 6 is similar to FIG. 3, but showing guide rollers provided between the driving wheels.

Referring to FIGS. 1, 2, 4 and 5, a sheet-feed type scanner in accordance with the present invention comprises a scanner base 1 having a document feed hole 10 at one end for receiving document sheathe 5, a document guide adapted for guiding document sheathe 5 along a fixed scanning plane 11 (see FIG. 4), an image pick-up mechanism fixedly mounted in the scanner base 1 to pick up image of document within the scanning plane 11 and to convert detected image signal into corresponding electrical signal, a document sheathe 5 adapted for contains document 4 (see FIG. 5), and a transmission mechanism adapted for moving the document sheathe 5 along the scanning plane 11. The image pick-up mechanism comprises a first light emitting device 30 and a second light emitting device 31 spaced from the scanning plane 11 at two opposite sides, a reflector 32, a focus lens 33 and an image sensor 34 spaced from the scanning plane 11 at the same side. The image sensor 34 is a charge coupled device that picks up image of light from a linear area. When the document sheathe 5 which contains document 4 passes on the linear area, the area within which this linear area passes forms the aforesaid scanning plane 11. This scanning plane 11 is the area within which image of document 4 is scanned.

Figure 7:
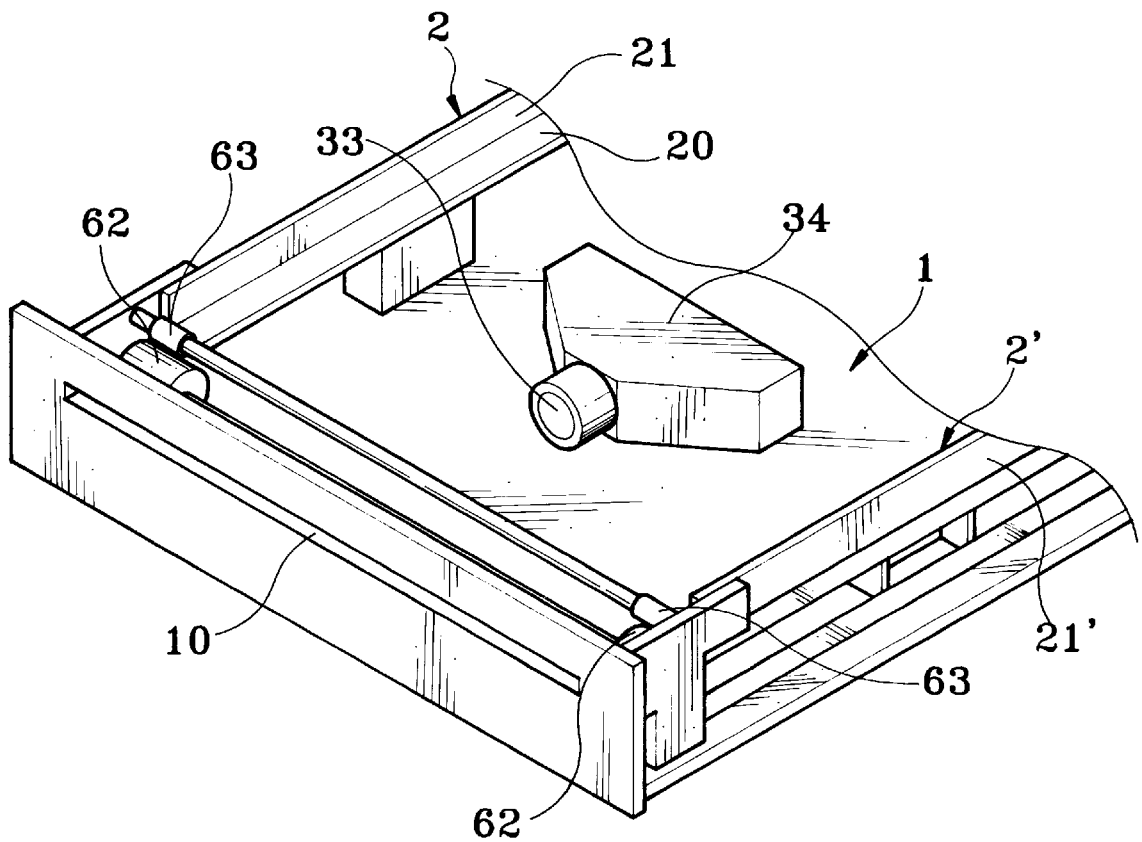
FIG. 7 shows an alternate form of the document guide according to the present invention.

The aforesaid document guide comprises two symmetrical supports 2;2' respectively spaced from two opposite lateral sides of the scanning plane 11. The supports 2;2' comprise a respective bottom bearing wall 20;20' adapted for carrying the document sheathe 5, a respective side wall 21;21' raised from the respective bottom bearing wall 20;20' at right angles, and a respective top wall 22;22' extended from the respective side wall 21;21' at right angles and disposed in parallel to the respective bottom bearing wall 20;20'. Alternatively, the supports 2;2' can be made having only the aforesaid bottom bearing wall 20;20' and side walls 21;21' without the top walls 22;22' (see FIG. 7). The bottom bearing walls 20;20' of the supports 2;2' are disposed in parallel to the scanning plane 11, and extend toward the document feed hole 10. When the document sheathe 5 is inserted into the document feed hole 10, it automatically fall to the bottom bearing walls 20;20' of the supports 2;2', and then moved along the bottom bearing walls 20;20'. The side walls 21;21' limit the moving direction of the document sheathe 5 to the predetermined path. The bottom bearing walls 20;20' must not cover any part of the scanning plane 11, otherwise use the transparent material The design of the supports 2;2' with top walls 22;22' allows the scanner to be used in a vertical position without causing the document sheathe 5 to fall out of the supports 2;2' during scanning.

Figure 8:
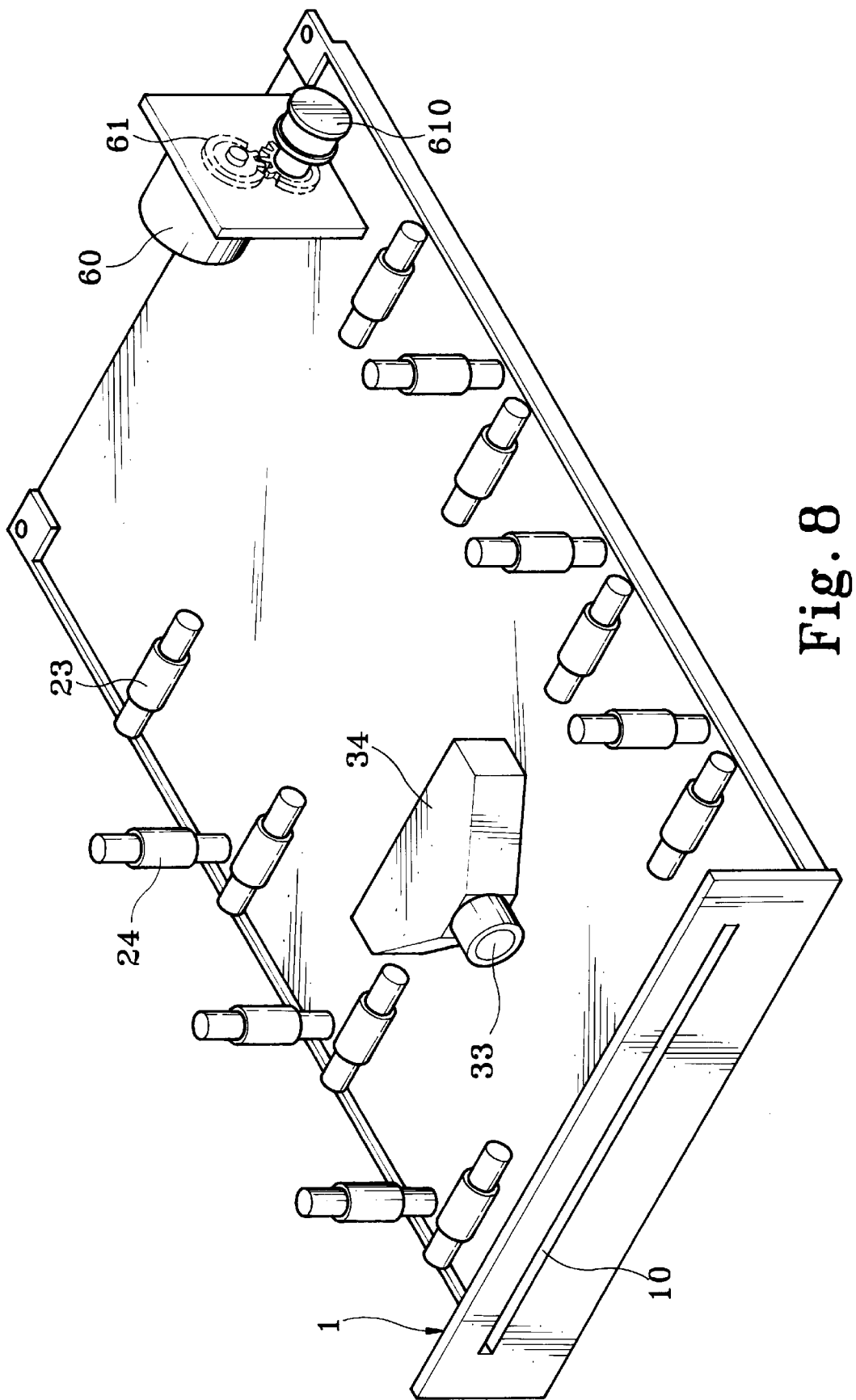
FIG. 8 shows another alternate form of the document guide according to the present invention.

FIG. 8 shows an alternate form of the document guide. According to this alternate form, the document guide comprises two symmetrical sets of horizontal rollers 23 disposed at two opposite sides and adapted for carrying the document sheathe 5, and two symmetrical sets of vertical rollers 24 adapted for guiding the document sheathe 5 over the horizontal rollers 23.

The aforesaid document sheathe 5 can be separately removed from the scanner base 1, comprising a first flat sheet member 50 and a second flat sheet member 51 connected to the first flat sheet member 50. The first flat sheet member 50 and the second flat sheet member 51 have at least one side connected in such a manner that document 4 can be retained in between the first flat sheet member 50 and the second flat sheet member 51 in a plane. The first flat sheet member 50 and the second flat sheet member 51 can be made from transparent acrylic or polyethylene. Preferably, transparent acrylic is the choice. If flexible material is used for making the first flat sheet member 50 and the second flat sheet member 51, a transparent support means must be provided below the scanning plane 11 to support the document sheath 5 in shape. The document sheathe 5 is guided by the supports 2;2' to pass over the linear scanning area of the image sensor 34. At least one of the flat sheet members 50;51 admits light. If both flat sheet members 50;51 admit light, light from the first light emitting device 30 can completely pass through the document sheathe 5, therefore penetrative document such as negative film, slide, etc., can be scanned. On the contrary, if the first flat sheet member 50 is opaque, light from the second light emitting device 31 will be reflected by document 4, then reflected by the reflector 32, and then focused onto the image sensor 34 by the focus lens 33. By means of changing the type of the document sheathe 5, the sheet-feed type scanner can be operated to scan reflective document as well as penetrative document.

Referring to Figures from 1 to 3 again, the aforesaid transmission mechanism comprises a motor 60, a belt pulley 610, a reduction gear 61 coupled between the motor 60 and the belt pulley 610, a transmission belt 611 mounted on the belt pulley 610, pairs of driving wheels 62;62' bilaterally disposed adjacent to the document feed hole 10 at different elevations and turned by the transmission belt 611 to carry the document sheathe 5 forwards along the supports 2;2' by means of a friction force, and pairs of driven wheels 63;63' respectively disposed in the radiation side of the driving wheels 62;62' for guiding the document sheathe 5 through the scanning plane 11. The driving wheels 62;62' and the driven wheels 63;63' are disposed outside the scanning area of the image pick-up mechanism so that any track left on the document sheathe 5 due to a friction contact between the document sheathe 5 and the wheels 62;62';63;63' does not affect the scanning quality. Further, guide rollers 64 may be disposed between the driving wheels 62;62' to guide the document sheathe 5. When the document sheathe 5 is guided by the supports 2;2' to pass through the scanning plane 11, the image sensor 34 picks up the image of every scanning line and converts it into corresponding electrical signal.

Figure 9:
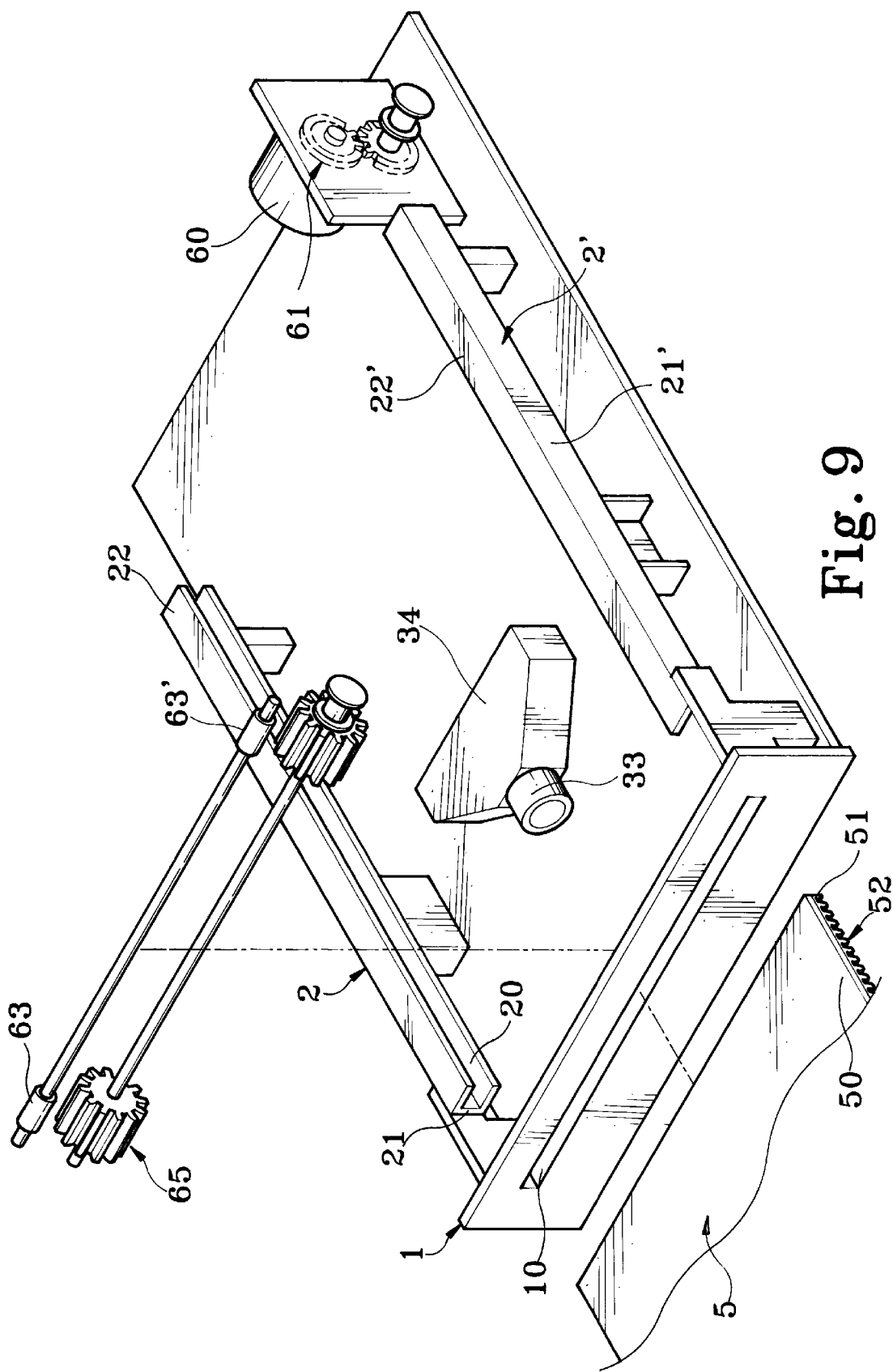
FIG. 9 shows an alternate form of the transmission mechanism according to the present invention.

FIG. 9 shows an alternate form of the transmission mechanism. According to this alternate form, driving gears 65 are provided and turned to move the document sheathe 5, and the document sheathe 5 has two racks 52 at two opposite sides which are forced into engagement with the driving gears 65 when the document sheathe 5 is inserted into the document feed hole 10.

It is to be understood that the drawings are designed for purposes of illustration only, and are not intended as a definition of the limits and scope of the invention disclosed.

We claim:

1. A sheet-feed type scanner comprising:

a scanner base defining a scanning plane and having a document feed hole at one end into which document to be scanned is inserted;

an image pick-up mechanism fixedly mounted in said scanner base and comprised of a light source and an image sensor, and adapted to pick up image of inserted document within the scanning plane and to convert detected image signal into corresponding electrical signal;

a document sheathe adapted for holding document for scanning, said document sheathe comprising a first rigid flat sheet member and a second rigid flat sheet member connected together for holding document in there between in a flat manner for scanning; and a transmission mechanism in direct contact with said document sheathe for moving said document sheathe along said scanning plane via a frictional force in a horizontal direction, and permitting document to be scanned by said image pick-up mechanism;

wherein said transmission mechanism comprises at least two pairs of horizontally mounted driving and driven wheels for moving said document sheathe and either (a) a pair of elongated side walls disposed at first and second sides, respectively, of said document sheathe for directing a movement of said document sheathe, or (b) at least a pair of vertically mounted driving wheels at first and second sides, respectively, of said document sheathe, wherein said document sheathe is dimensioned to be in contact with said vertically mounted driving wheels so as to allow said vertically mounted driving to exert a frictional force thereon and cause said document sheathe to move.

2. The sheet-feed type scanner according to claim 1 wherein said transmission mechanism comprises:

(a) at least two pairs of horizontally mounted driving and driven wheels for moving said document sheathe; and (b) a pair of elongated side walls disposed at first and second sides, respectively, of said document sheathe for directing a movement of said document sheathe.

3. The sheet-feed type scanner according to claim 1 wherein said transmission mechanism comprises:

(a) at least two pairs of horizontally mounted driving and driven wheels for moving said document sheathe; and (b) at least a pair of vertically mounted driving wheels at first and second sides, respectively, of said document sheathe, wherein said document sheathe is dimensioned to be in contact with said vertically mounted driving wheels so as to allow said vertically mounted driving to exert a frictional force thereon and cause said document sheathe to move.

4. The sheet-feed type scanner according to claim 1 wherein said transmission mechanism comprises is constructed such that it will cause said document sheathe to move backward after an scanning operation.

* * * * *